Patented Oct. 14, 1947

2,429,178

UNITED STATES PATENT OFFICE 2,429,178

BENZOXAZOLES AND METHOD OF PREPARATION

Alfred W. Anish, Johnson City, N. Y.

No Drawing. Application March 10, 1944,
Serial No. 525,936

2 Claims. (Cl. 260—307)

My invention relates to new compounds of the benzoxazole class and their method of preparation.

More specifically, my invention relates to benzoxazoles which contain as a substituent in the aryl nucleus a branched chain alkyl radical or a branched chain alkyl radical containing an aryl group as a substituent. My new compounds may be used as intermediates in the production of new oxacarbocyanine dyes which are particularly useful in sensitizing photographic emulsions. Such dyes made from my novel benzoxazole intermediates are characterized by a steep cut-off in the spectral curve. Such characteristics are highly desirable, especially in sensitizing dyes used in color photography emulsions, where it is desirable that the multi-layer emulsions be sensitive to certain ranges of wave lengths.

My novel compounds contain a nucleus which may be represented by the following structural formula:

$$R-\underset{\underset{7}{\overset{6}{|}}}{\overset{\overset{4}{|}}{\underset{}{\bigcirc}}}\overset{3}{\underset{1}{\overset{O}{\underset{N}{\bigcirc}}}}\overset{}{\underset{}{2}}C-Z$$

and the quarternary ammonium salts thereof.

In the above formula R represents a branched chain alkyl radical or a branched chain alkyl radical containing an aryl group as a substituent such as isobutyl, cumyl, isoamyl, tertiary amyl, tertiary hexyl, isopropyl, diisobutyl, 2- or 3-methyl-butyl groups. The radical may be substituted in any suitable position in the benzene nucleus as, for example, in the 5- or 6-position. Z represents an alkyl group, such as methyl, ethyl, propyl; or any suitable substituent.

In general, the intermediates may be prepared by first nitrating a phenol which is substituted in the benzene nucleus by a secondary or tertiary alkyl or aryl-alkyl radical. Such nitro-phenols may be prepared according to the process of Patent No. 2,207,727. The nitro-compound is then reduced to form the corresponding phenol amine and the latter is finally reacted with a fatty acid, fatty acid anhydride or fatty acid-fatty acid anhydride mixture to form the secondary or tertiary substituted benzoxazole.

As illustrative of the new 2-alkylbenzoxazole intermediates and the method of their preparation are the following examples:

*Example 1.*—2-methyl-6-tertiary-butyl - benzoxazole.

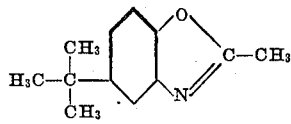

2-nitro-4-tertiary-butyl-phenol was prepared by the method described in U. S. 2,207,727 as follows: 150 grams of p-tertiary-butyl-phenol in 500 cc. of benzol was nitrated with a mixture of 128.0 cc. of 70% nitric acid and 256.0 cc. of water. The nitro compound was vacuum distilled and has a boiling point of 136° C. at 14 mm. The nitro-tertiary-butyl-phenol was then reduced with alkaline sodium hydrosulfite as follows:

20 grams of 2-nitro-4-tertiary-butyl-phenol in 800 cc. of 10% caustic soda solution was heated to 82° C. and 75.0 grams of sodium hydrosulfite added. The clear alkaline solution was acidified with dilute acetic acid and the white crystalline plates of 2-amino-4-tertiary-butyl-phenol precipitated. The compound melts at 162–4° C. The yield obtained was 16.4 grams. By heating 44.7 grams of the dried amino-tertiary-butyl-phenol with glacial acetic acid, or with an acetic acid-acetic acid anhydride mixture containing 75 cc. of each, 45.0 grams of 2-methyl-6-tertiary-butyl-benzoxazole was obtained. The compound has a boiling point of 137° C. at 16 mm.

When heated with ethyl p-toluenesulfonate, the substituted benzoxazole is converted into the corresponding quaternary ammonium salt.

*Example 2.*—2-methyl-6-cumyl-benzoxazole.

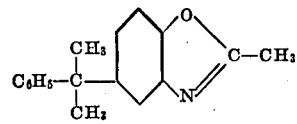

2-nitro-4-cumyl-phenol was prepared by nitrating a mixture of 24.2 grams of p-cumyl-phenol in 40.0 cc. of benzol with a mixture of 12.8 cc. of 70% nitric acid in 25.6 cc. of water at 7–10° C. The nitro compound has a boiling point of 145° C. at 15 mm. 2-amino-4-cumyl-phenol was obtained from the nitro compound by alkaline sodium hydrosulfite reduction. 2-methyl-6-cumyl benzoxazole was then prepared by refluxing 8.2 grams of the 2-amino-4-cumyl-phenol with an acetic acid-acetic anhydride mixture containing 15 cc. of each and finally dry distilling the reaction mixture. The 2-methyl-6-cumyl benzoxazole obtained boils at 162° C. at 16 mm.

When heated with ethyl p-toluenesulfonate, the substituted benzoxazole is converted into the corresponding quaternary ammonium salt.

*Example 3.*—2-methyl-6-isoamyl-benzoxazole.

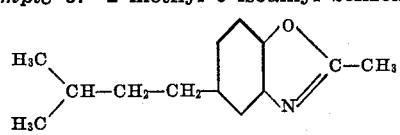

2-nitro-4-isoamyl-phenol was prepared by nitrating a mixture of 37.4 grams of p-isoamyl-phenol in 150.0 cc. of benzene with a mixture of 22.6 cc. of 70% nitric acid diluted with 22.6 cc. of water at 0–8° C. The nitro compound has a boiling point 145–150° C. at 16 mm.

10.0 grams of the 2-nitro-4-isoamyl-phenol thus obtained was reduced with alkaline sodium hydrosulfite. 16 grams of the amino-compound so obtained was dry distilled from an acetic acid-acetic anhydride mixture containing 25 cc. of each to form 2-methyl-6-isoamyl-benzoxazole. The compound has a boiling point of 270° C. at 760 mm. and 147° C. at 16 mm.

When heated with ethyl-p-toluenesulfonate, the substituted benzoxazole is converted into the corresponding quaternary ammonium salt.

The benzoxazoles obtained according to the above examples may be converted into other quaternary salts by heating with other suitable alkylating agents as ethyl iodide, methyl sulphate, diethyl sulphate, ethyl perchlorate, ethyl nitrate or any alkyl or alkaryl ester.

Other fatty acids and fatty acid anhydrides than the acetic acid and acetic acid anhydrides may be used in the process. In such case a higher alkyl radical is substituted for the methyl group. Thus, when butyric acid or anhydride is used, the production is a 2-propylbenzoxazole. In the case of the use of the free fatty acid, prolonged boiling of the amino-compound is required to effect ring closures.

In place of the sodium hydrosulfite, other alkali metal hydrosulfites may be used, such as potassium hydrosulfite. Also zinc hydrosulfite and sodium sulfoxylate formaldehyde may be used as reducing agents.

To form the 5-substituted secondary and tertiary alkyl and alkyl-aryl benzoxazoles, I proceed in the same manner as set forth in the above examples, except that I start with a 2-nitro-phenol which is substituted in the 5-position with a tertiary-butyl, a cumyl, or isoamyl, or any other secondary or tertiary-alkyl or aryl-alkyl radical.

The intermediates may be condensed to form the new oxacarbocyanine dyes as disclosed in my co-pending application No. 525,935, filed March 10, 1944. In general, the process of forming the dye comprises condensing the quaternary ammonium salts of my intermediates in the presence of a suitable condensing agent, as for example, ethyl orthoformate.

I claim:
1. 2-methyl-6-cumyl-benzoxazole and the quaternary ammonium salts thereof.
2. A method of preparing 2-methyl-6-cumyl-benzoxazole which comprises reacting 2-amino-4-cumyl-phenol with a mixture containing equal parts of acetic acid and acetic acid anhydride.

ALFRED W. ANISH.

REFERENCES CITED

The following references are of record in the file of this patent:

UNITED STATES PATENTS

| Number | Name | Date |
|---|---|---|
| 2,207,727 | Galloway | July 16, 1940 |
| 1,745,843 | Clark | Feb. 4, 1930 |
| 2,173,486 | Schneider | Sept. 19, 1939 |
| 2,060,382 | Schneider | Nov. 10, 1936 |
| 1,962,124 | Brooker | June 12, 1934 |
| 2,323,504 | Wilson | July 6, 1943 |
| 2,071,899 | Piggott | Feb. 23, 1937 |

OTHER REFERENCES

Chem. Abstracts, vol. 26, page 705, citing: Bull. Soc. Chim. (4), vol. 49, page 1213-22 (1931).
Chem. Abstracts, vol. 32, page 2119, citing: J. Soc. Chem. Ind., vol. 56, page 474T (1937).
Ladenburg-Berichte, vol. 9, pages 1524-1527.